United States Patent
Qi et al.

(10) Patent No.: US 9,967,229 B2
(45) Date of Patent: *May 8, 2018

(54) APPARATUS, SYSTEM AND METHOD OF PROTECTING A SERVICE IDENTIFIER

(71) Applicant: INTEL CORPORATION, Santa Clara, CA (US)

(72) Inventors: Emily H. Qi, Gig Harbor, WA (US); Jesse Walker, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/472,714

(22) Filed: Mar. 29, 2017

(65) Prior Publication Data
US 2017/0208030 A1    Jul. 20, 2017

Related U.S. Application Data

(63) Continuation of application No. 14/582,977, filed on Dec. 24, 2014, now Pat. No. 9,692,699.
(Continued)

(51) Int. Cl.
| | |
|---|---|
| *H04K 1/00* | (2006.01) |
| *H04L 9/00* | (2006.01) |
| *H04L 9/32* | (2006.01) |
| *H04L 29/12* | (2006.01) |
| *H04W 12/04* | (2009.01) |
| *H04W 48/16* | (2009.01) |
| *H04L 29/06* | (2006.01) |

(52) U.S. Cl.
CPC ........ *H04L 61/1541* (2013.01); *H04L 9/3242* (2013.01); *H04L 63/061* (2013.01); *H04L 63/0876* (2013.01); *H04W 12/04* (2013.01); *H04W 48/16* (2013.01)

(58) Field of Classification Search
CPC ............... H04L 61/1541; H04L 9/3242; H04L 63/0876; H04L 63/061; H04W 48/16; H04W 12/04
USPC ......... 713/171, 170, 181; 380/255, 262, 270
See application file for complete search history.

(56) References Cited

U.S. PATENT DOCUMENTS

| | | | |
|---|---|---|---|
| 6,701,435 B1 | 3/2004 | Numao et al. | |
| 9,692,699 B2 * | 6/2017 | Qi | .................. H04L 45/7453 |

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Aravind K Moorthy
(74) *Attorney, Agent, or Firm* — Shichrur & Co.

(57) ABSTRACT

Some demonstrative embodiments include apparatuses, systems and/or methods of securing a service Identifier (ID). For example, a wireless device may include a Secure Service Identifier (SSID) processor to determine a SSID corresponding to a service, the SSID including an encrypted value being based on a service name key from a service provider of the service and a service name corresponding to the service; and a radio to transmit a wireless message including the SSID.

50 Claims, 7 Drawing Sheets

Related U.S. Application Data

(60) Provisional application No. 62/072,658, filed on Oct. 30, 2014.

(56) References Cited

U.S. PATENT DOCUMENTS

| | | |
|---|---|---|
| 2010/0299417 A1 | 11/2010 | Austin et al. |
| 2012/0243524 A1 | 9/2012 | Verma et al. |
| 2013/0177002 A1* | 7/2013 | Sun ................ H04W 48/12 370/338 |
| 2014/0313911 A1 | 10/2014 | Kim |
| 2015/0071121 A1 | 3/2015 | Patil et al. |
| 2015/0195710 A1 | 7/2015 | Bar-Niv et al. |
| 2015/0207778 A1 | 7/2015 | Jang et al. |
| 2015/0230161 A1 | 8/2015 | Park et al. |
| 2016/0037564 A1 | 2/2016 | Borden |
| 2016/0127890 A1 | 5/2016 | Qi et al. |

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.

Office Action for U.S. Appl. No. 14/582,977, dated Jun. 2, 2016, 19 pages.

Office Action for U.S. Appl. No. 14/582,977, dated Nov. 4, 2016, 8 pages.

* cited by examiner

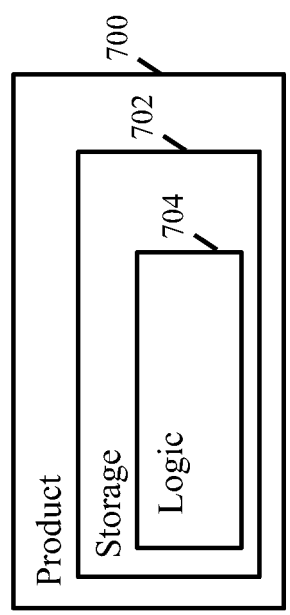

APPARATUS, SYSTEM AND METHOD OF PROTECTING A SERVICE IDENTIFIER

CROSS REFERENCE

This application claims the benefit of and priority from U.S. Provisional Patent Application No. 62/072,658 entitled "Apparatus, System and Method of Protecting a Service Identifier", filed Oct. 30, 2014, the entire disclosure of which is incorporated herein by reference.

TECHNICAL FIELD

Embodiments described herein generally relate to protecting a service identifier.

BACKGROUND

A service Identifier (ID) may be used by wireless communication technologies, for example, Wireless Fidelity (WiFi) technologies, e.g., WiFi Direct Services (WFDS), Neighbor Awareness Networking (NAN), and/or other WiFi or other wireless technologies.

For example, the Service ID may be used to advertise or seek for a specific service.

The Service ID may have the form of a Service Hash, which may be formed, for example, based on a service name of the service. For example, the Service Hash may be determined by using the first 6 octets of the SHA-256 algorithm hashing of the value of the service name. In one example, a lower case representation of the value of the service name may be used to calculate the Service Hash.

The Service ID may not be required to be unique.

The Service ID may be configured to provide a sufficient representation of a service name for discovery, for example, using a Probe Request/Response discovery mechanism, a NAN Service Discovery mechanism, or any other discovery mechanism or protocol.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 7 is a schematic illustration of a product, in accordance with some demonstrative embodiments.

DETAILED DESCRIPTION

Figure 1:
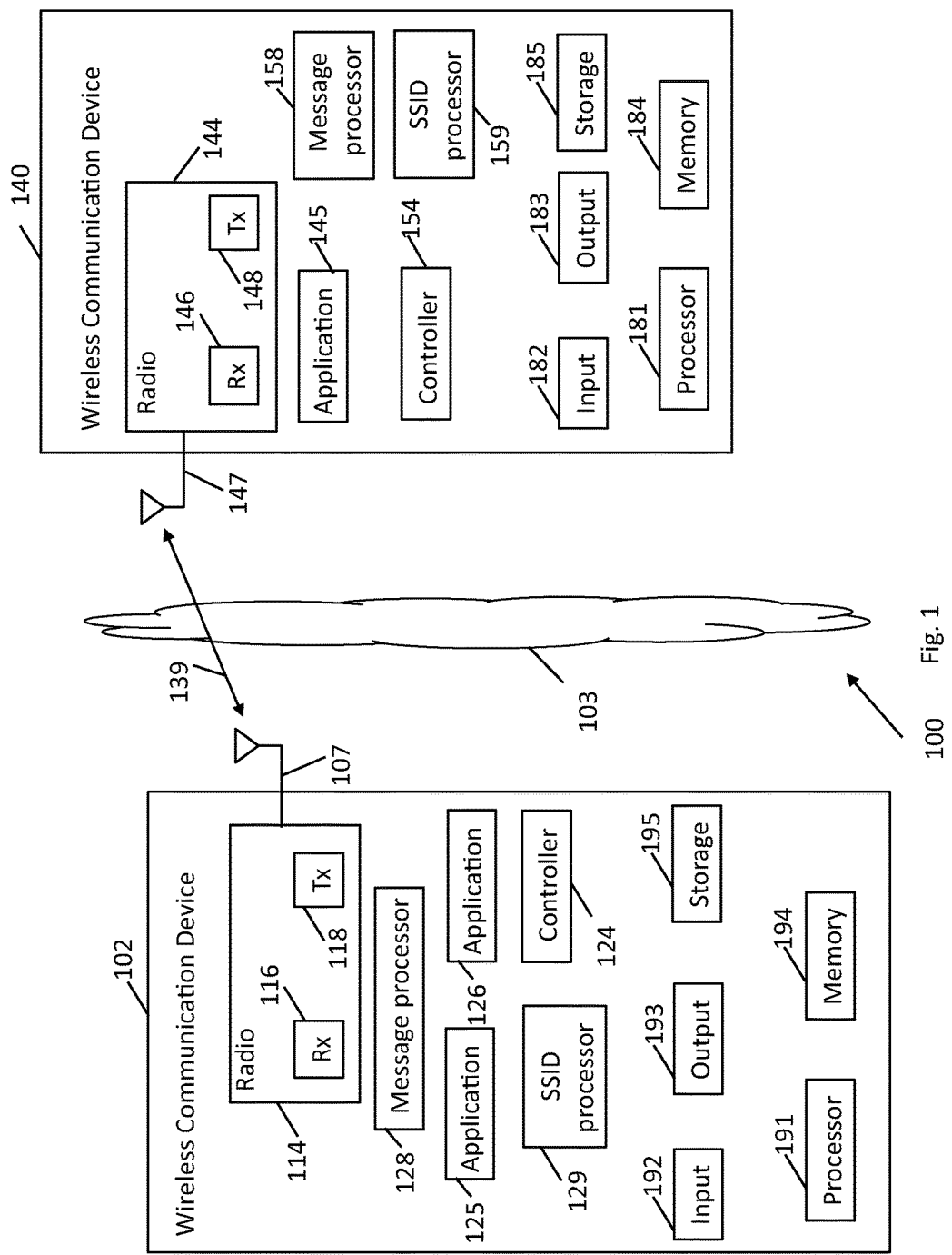
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing Wireless Fidelity (WiFi) Alliance (WFA) Specifications (including WFA Neighbor Awareness Networking (NAN) Specification) and/or future versions and/or derivatives thereof, devices and/or networks operating in accordance with existing WFA Peer-to-Peer (P2P) specifications (*WiFi P2P technical specification*, version 1.2, 2012) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification* Version 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless IAN Medium Access Control (MAC) and Physical Layer (PHY) Specifications*, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part*

11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("*IEEE P802.11ad-2012, IEEE Standard for Information Technology—Telecommunications and Information Exchange Between Systems Local and Metropolitan Area Networks—Specific Requirements—Part 11: Wireless IAN Medium Access Control (MAC) and Physical Layer (PHY) Specifications—Amendment 3: Enhancements for Very High Throughput in the 60 GHz Band*", 28 December, 2012); IEEE 802.11Revmc; and/or IEEE 802.11x) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a QoS basic service set (BSS), a tunneled direct-link setup (TDLS) link, a STA-to-STA communication in an independent basic service set (IBSS), or the like.

Some demonstrative embodiments are described herein with respect to WiFi Direct P2P communication. However, other embodiments may be implemented with respect to any other Peer to Peer communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, and/or any other frequency band.

In some demonstrative embodiments, devices 102 and 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable to transmit and/or receive wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, wireless communication devices 102 and/or 140 may form, or communicate as part of, a wireless local area network (WLAN).

In some demonstrative embodiments, wireless communication devices 102 and/or 140 may form, or communicate as part of, a WiFi network.

In some demonstrative embodiments, wireless communication devices 102 and/or 140 may form, or communicate as part of, a WiFi Direct (WFD) network, e.g., a WiFi direct services (WFDS) network, and/or may perform the functionality of one or more WFD devices.

In one example, device 102 and device 140 may include, or may perform the functionality of a WiFi Direct device.

In some demonstrative embodiments, wireless communication medium 103 may include a direct link, for example, a PTP link, e.g., a WiFI direct P2P link, for example, to enable direct communication between device 102 and device 140.

In some demonstrative embodiments, wireless communication devices 102 and/or 140 may perform the functionality of WFD P2P devices. For example, devices 102 and 140 may be able to perform the functionality of a P2P client device, and/or a P2P group Owner (GO) device.

In some demonstrative embodiments, wireless communication devices 102 and/or 140 may be capable of forming, or communicating as part of, a WiFi Neighbor Awareness Networking (NAN) network and/or may perform the functionality of one or more NAN devices.

In other embodiments, wireless communication devices 102 and/or 140 may form and/or communicate as part of any other network and/or perform the functionality of any other wireless devices or stations.

In some demonstrative embodiments, devices 102 and/or 140 may include one or more applications configured to provide, share, and/or to use one or more services, e.g., a social application, a file sharing application, a media application and/or the like, for example, using a PTP network, a P2P network, WFD network, a NAN network, a WiFI network, a WLAN network, or any other network.

In some demonstrative embodiments, device 102 may execute an application 125 and/or an application 126. In some demonstrative embodiments, device 140 may execute an application 145.

In some demonstrative embodiments, devices 102 and 140 may be capable of sharing, showing, sending, transferring, printing, outputting, providing, synchronizing, and/or exchanging content, data, and/or information, e.g., between application 154 and applications 125 and/or 126.

In some demonstrative embodiments, devices 102 and/or 140 may include a controller configured to control one or more functionalities of devices 102 and/or 140, for example, one or more functionalities of communication, e.g., WLAN communication, PTP communication, NAN communication and/or any other communication, between devices 102 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry, e.g., one or more processors including circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below. In one example, controllers 124 and/or 154 may include one or more processors having circuitry to cause a device or a station, e.g., devices 102 and/or 140, to perform one or more functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry, e.g., one or more processors including circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, devices 102 and/or 140 may perform the functionality of a device or station, for example, a WiFi device, a WLAN device, a PTP device, a WFD P2P device, or a NAN device, capable of advertising one or more services and/or discovering other services according to a discovery protocol and/or scheme.

In some demonstrative embodiments, radios 114 and/or 144 may communicate over wireless communication medium 103 according to a discovery scheme, for example, a NAN discovery scheme, a WiFi discovery scheme, a WLAN discovery scheme, or any other discovery scheme, e.g., as described below.

In some demonstrative embodiments, devices 102 and/or 140 may perform a discovery process according to the discovery scheme, for example, to discover each other and/or to establish a wireless communication link, e.g., directional and/or high throughput wireless communication link.

In some demonstrative embodiments, devices 102 and/or 140 may be configured to enable time synchronization between device 102, device 140 and/or one or more other devices, e.g., performing the functionality of Wi-Fi stations (STAs), for example, such that STAs can discover each other more efficiently and/or quickly.

Some demonstrative embodiments are described below with respect to a NAN discovery scheme, and to NAN discovery frames of the NAN discovery scheme. However, in other embodiments, any other discovery scheme and/or discovery frames may be used.

In some demonstrative embodiments, the discovery scheme may include a plurality of contention-based discovery windows (DWs).

In some demonstrative embodiments, devices 102 and/or 140 may perform the functionality of NAN devices, e.g., belonging to a NAN cluster, which may share a common set of NAN parameters, for example, including a common NAN timestamp, e.g., a NAN cluster timestamp, and/or a common time period between consecutive discovery windows (DWs), e.g., as described below. The NAN timestamp may be communicated, for example, as part of a NAN beacon frame, which may be communicated in the NAN cluster. In one example, the NAN timestamp may include a Time Synchronization Function (TSF) value, for example, a cluster TSF value, or any other value.

In some demonstrative embodiments, devices 102 and/or 140 may be configured to discover one another over a predefined communication channel ("the social channel"), e.g., as described below. In one example, the Channel 6 in the 2.4 GHz band may be defined as the NAN social channel. Any other channel may be used as the social channel.

In some demonstrative embodiments, devices 102 and/or 140 may transmit discovery frames during the plurality of DWs, e.g., over the social channel.

In one example, devices 102 and/or 140 may transmit the discovery frames to discover each other, for example, to enable discovering and/or using the one or more services provided by applications 125, 126 and/or 145.

In some demonstrative embodiments, devices 102 and/or 140 may communicate during a DW according to a contention mechanism. For example, devices 102 and/or 140 may check whether or not a channel is unoccupied prior to an attempt to transmit a discovery frame during the discovery window.

In some demonstrative embodiments, a device of devices 102 and/or 140, e.g., device 102, may not transmit the discovery frame during the DW, e.g., if the channel is occupied. In some demonstrative embodiments, device 102 may transmit the discovery frame during the DW, e.g., if the channel is unoccupied.

In some embodiments, the discovery frame may be transmitted as a group addressed, e.g., broadcast or multicast, discovery frame. In other embodiments, the discovery frame may be transmitted as any other type of frame.

In some demonstrative embodiments, the discovery frame may not require an acknowledgement frame. A cording to these embodiments, a transmitter of the discovery frame may not backoff a transmission of the discovery frame.

In some demonstrative embodiments, the discovery frame transmitted by device 102 during the DW may be configured to enable other devices or services that are running on other devices to discover the services on device 102.

In some demonstrative embodiments, devices 102 and/or 140 may use a service Identifier (ID), for example, to advertise or seek for a specific service.

In some demonstrative embodiments, the Service ID may have the form of a Service Hash, which may be formed, for example, based on a service name. For example, the Service Hash may be determined by using the first 6 octets of the SHA-256 algorithm hashing of the value of the service name. In one example, a lower case representation of the value of the service name may be used to calculate the Service Hash. In other embodiments, the Service ID may be determined in any other manner and/or using any other hash function.

In some demonstrative embodiments, the Service ID may not be required to be unique.

In some demonstrative embodiments, the Service ID may be configured to provide a sufficient representation of a service name for discovery, for example, using a Probe Request/Response discovery mechanism, a NAN Service Discovery mechanism, or any other discovery mechanism or protocol.

In some demonstrative embodiments, devices 102 and/or 140 may include the service ID of service in one or more messages 139 communicated between devices 102, 140 and/or with one or more other devices. In one example, device 102 may include the service ID of a service provided by device 102, e.g., as part of one or more messages 139 transmitted by device 102; and/or device 140 may include the service ID of a service provided by device 102, e.g., as part of one or more messages 139 transmitted by device 140.

In some demonstrative embodiments, messages 139 may include one or more discovery frames or messages, for example, a WLAN discovery message, a NAN service discovery frame, a WFDS discovery frame, a WiFi discovery frame, a probe request, a probe response, and/or any other message.

In some demonstrative embodiments, it may not be desired to expose the service ID, e.g., to a third party, in some implementations, scenarios and/or use cases, e.g., due to privacy and/or tracking concerns. In one example, a snooper may use the service ID, for example, to determine which services are pre-eminent in an area, and, for example, to develop use profiles of different services.

In some demonstrative embodiments, devices 102 and/or 104 may be configured to protect, encrypt, secure and/or obfuscate the Service ID, e.g., as described below.

In some demonstrative embodiments, devices 102 and/or 140 may be configured to obfuscate the service ID, for example, in a manner, which may be configured to prevent tracking and/or to preserve privacy.

Some demonstrative embodiments are described herein with respect to protecting a service ID of a NAN communication or a WFDS communication. However, other embodiments may be implemented with respect to protecting a service ID of any other type of communication, WLAN communications, WiFi communications, any other IEEE 802.11 communications, and/or any other type of communication.

In some demonstrative embodiments, devices 102 and 140 may utilize a Secured Service ID (SSID) to identify a Service, e.g., instead of the service ID.

In some demonstrative embodiments, device 102 may include a SSID processor 129 configured to generate, process and/or access an SSID communicated by device 102, e.g., as described below.

In one example, SSID processor 129 may be configured to generate one or more SSIDs to be transmitted by device 102, and/or SSID processor 129 may be configured to access and/or to process one or more SSIDs received by device 102, e.g., as described below.

In some demonstrative embodiments, device 140 may include a SSID processor 159 configured to generate, process and/or access one or SSIDs communicated by device 140.

In one example, SSID processor 159 may be configured to generate one or more SSIDs to be transmitted by device 140, and/or SSID processor 159 may be configured to access and/or to process one or more SSIDs received by device 140, e.g., as described below.

In some demonstrative embodiments, SSID processors 129 and/or 159 may include circuitry, e.g., one or more processors including circuitry, memory circuitry, and/or any other circuitry and/or logic, configured to perform the functionality of SSID processors 129 and/or 159. Additionally or alternatively, one or more functionalities of SSID processors 129 and/or 159 may be implemented by logic, which may be executed by a machine and/or one or more processors, e.g., as described below.

In some demonstrative embodiments, at least part of the functionality of SSID processor 129 may be implemented as part of radio 114, and/or at least part of the functionality of SSID processor 159 may be implemented as part of radio 144.

In some demonstrative embodiments, at least part of the functionality of SSID processor 129 may be implemented as part of controller 124 and/or message processor 128, and/or at least part of the functionality of SSID processor 159 may be implemented as part of controller 154 and/or message processor 158.

In other embodiments, at least part of the functionality of SSID processor 129 may be implemented as part of any other element of device 102, and/or at least part of the functionality of SSID processor 159 may be implemented as part of any other element of device 104.

In some demonstrative embodiments, a "Service Provider" of a service may be configured to generate a Service name key ("service-name-key"), e.g., according to a policy. The "Service Provider" may be, for example, a web service provider, cloud service provider, or any other type of service provider of any other service.

In some demonstrative embodiments, the "Service Provider" may distribute the service name key to devices 102 and/or 140, for example, at service registration time, or at any other time, e.g., as part of any update.

In some demonstrative embodiments, devices 102 and/or 140 may retrieve and/or "pull" the Service name key from the "Service Provider", e.g., periodically, for example, as part of an update procedure or in any other manner, e.g., according to a policy.

In some demonstrative embodiments, the service name key may include a group key, which may be provided to a group of devices, and/or which may be assigned to a group of services.

In one example, a service provider may generate a group service name key, which may include a group key to be provided to a plurality of devices, e.g., a group of devices, which may be using a service or a plurality of services provided by the service provider.

In another example, one or more service providers may generate a group service name key, which may include a group key to be used with respect to a plurality of services, e.g., a group of services, which may be provided by the one or more service providers.

In other embodiments, a service name key may be assigned to a single user, or a single service.

In other embodiments, a plurality of service name keys may be derived from a common "group" or "master" key, for example, to enable a device to derive the plurality of service keys based on the master key.

In other embodiments, any other service name key may be used.

In some demonstrative embodiments, devices 102 and/or 140 may use the Service name key of a service to determine the SSID corresponding to the service, e.g., as described below.

In some demonstrative embodiments, devices 102 and/or 140 may be configured to transmit the SSID as part of one or more of messages 139, e.g., instead of the service ID.

For example, devices 102 and/or 140 may be configured to transmit the SSID as part of messages of a Probe Request/Response discovery mechanism, messages of a NAN Service Discovery mechanism, or any other type of message, e.g., for advertising and discovering the service.

In some demonstrative embodiments, SSID processor 129 and/or SSID processor 159 may be configured to compute the SSID corresponding to a service, e.g., as described below.

In some demonstrative embodiments, the SSID corresponding to a service may be transmitted by a first device ("the transmitter of the SSID"), e.g., device 102, and may be received by a second device ("the receiver of the SSID"), e.g., device 140.

In some demonstrative embodiments, the transmitter of the SSID may be configured to determine the SSID corresponding to the service, to generate a message including the SSID, and to transmit the message including the SSID.

For example, SSID processor 129 may determine a SSID corresponding to a service, message processor 128 may generate a message including the SSID, for example, a discovery message, and radio 114 may transmit the message including the SSID.

In some demonstrative embodiments, the SSID may be constructed in a manner, which may make it very hard, or even impossible, to "decrypt" and/or "reverse" the SSID into the corresponding service name, e.g., as described below. For example, it may be computationally infeasible to "decrypt" and/or "reverse" the SSID into the corresponding service name.

In some demonstrative embodiments, instead of attempting to "decrypt" or "reverse" the received SSID, the receiver of the SSID may be configured to determine whether or not the received SSID is to represent a service name of one or more service names, which may be known to the receiver of the SSID, e.g., as described below.

In some demonstrative embodiments, device 140 may store in a memory, e.g., memory 184 or any other dedicated or non-dedicated memory of device 140, one or more service names corresponding to one or more services. For example, the service names may include service names of services being provided by device 140, services previously provided by device 140, services to which device 140 may be subscribed, services being sought by device 140, services previously sought by device 140, services known to one or more application being executed by device 140, and/or any other services.

In some demonstrative embodiments, radio 144 may receive a message, e.g., a discovery message, including the SSID, e.g., from device 102.

In some demonstrative embodiments, SSID processor 158 may be configured to process the received SSID and to determine whether or not the received SSID is to represent a service name of the one or more service names stored by device 140, e.g., as described below.

In some demonstrative embodiments, SSID processor 129 may be configured to determine a SSID corresponding to a service, e.g., as described below. For example, the service may include a service being provided by device 102, a service previously provided by device 102, a service to which device 102 may be subscribed, a service being sought by device 102, a service previously sought by device 102, a service being used by one or more applications executed by device 102, and/or any other service.

In some demonstrative embodiments, SSID processor 129 may determine the SSID corresponding to the service to include an encrypted value being based on a service name key from a service provider of the service and a service name corresponding to the service, e.g., as described below.

In some demonstrative embodiments, device 102 may receive the service name key corresponding to the service, for example, from the service provider of the service, for example, at registration to the service, or at any other time before or after registration of device 102, applications 125 and/or 126, and/or a user of device 102 to the service, e.g., as part of a scheduled or non-scheduled update, e.g., a "pull" update initiated by device 102, or a "push" update initiated by the service provider.

The service provide may include, for example, a web service provider of a web service, a cloud service provider of a cloud service, a local service provider of a local service, a remote service provider of a remote service, an Internet service provider of an Internet service, or any other type of service and/or service provider.

In some demonstrative embodiments, device 102 may receive, retrieve and/or "pull", e.g., periodically, an updated version of the service name key, e.g., from the "Service Provider", for example, according to a predefined update policy.

In some demonstrative embodiments, controller 124 may cause message processor 128 to generate a message including the SSID, and controller 124 may cause radio 114 to transmit the message including the SSID.

In some demonstrative embodiments, controller 124 may cause radio 114 to transmit a discovery frame including the SSID in a service identifier (SID) field, e.g., instead of a service identifier corresponding to the service.

In some demonstrative embodiments, the discovery frame may be a Neighbor Awareness Network (NAN) discovery frame.

In some demonstrative embodiments, the discovery frame may be Wireless Fidelity (WiFi) Direct Services (WFDS) discovery frame.

In other embodiments, the discovery frame may include a probe request, a probe response, and/or any other discovery frame.

In other embodiments, controller 124 may cause radio 114 to transmit any other type of message including the SSID, e.g., during a discovery process and/or as part of any other process and/or communication.

In some demonstrative embodiments, SSID processor 129 may determine a hash value based on a hash of a combination of the service name key and the service name, and may determine the SSID by applying a cryptographic function to the hash value, e.g., as described below.

In some demonstrative embodiments, the hash value may include a truncated hash value.

In some demonstrative embodiments, SSID processor 129 may be configured to determine the truncated hash value by truncating a hash of the combination of the service name key and the service name, e.g., as described below.

In some demonstrative embodiments, the truncated hash value may be configured to have a byte-size of an encryption-key byte-size of the cryptographic function.

In one example, the cryptographic function may have a byte size of 128 bytes. For example, the cryptographic function may include a 128-byte Advanced Encryption Standard (AES) function, e.g., as described below. According to this example, the truncated hash value may include a 128-byte hash value, e.g., as described below.

In other embodiments, the truncated hash value may be configured to have any other byte size.

In other embodiments, the hash value may not be truncated, e.g., a non-truncated hash value may be used.

For example, the hash value may not be truncated, for example, if a byte-size of a hash function used to generate the hash value may be equal to the byte size of the cryptographic function.

In one example, the hash value may be determined using a 256-byte hash function, e.g., as described below, and the cryptographic function may include a 256-byte cryptographic function, e.g., AES 256. According to this example, there may be no need to truncate the hash value, e.g., prior to applying the cryptographic function.

In some demonstrative embodiments, the cryptographic function may be a one-way cryptographic compression function. In one example, generating the SSID using a one-way cryptographic compression function may enable to increase the strength of the SSID against attacks.

In some demonstrative embodiments, the one-way cryptographic compression function may be a Matyas-Meyer Oseas Construction function, e.g., as described below.

In some demonstrative embodiments, generating the SSID using the Matyas-Meyer Oseas Construction function, e.g., as described below, may enable generating the SSID in an efficient manner and/or may increase the security of the SSID.

In some demonstrative embodiments, generating the SSID using the Matyas-Meyer Oseas Construction function, e.g., as described below, may provide the SSID having, for example, $2^{nd}$ pre-image resistance and/or pseudo-randomness.

In other embodiments, the SSID may be generated using a Davies Meyer Construction function, a Preneel-Miyaguchi Construction function, a Shrimpton-Stam Construction function, or any other construction function.

In other embodiments, any other one-way cryptographic compression function, may be used, for example, any other construction of a cryptographic hash compression function from a block cipher.

In other embodiments, any other cryptographic function may be applied to generate the SSID.

In some demonstrative embodiments, SSID processor 129 may determine an encrypted value by using the hash value as an encryption key to encrypt a parameter value, e.g., as described below.

In some demonstrative embodiments, SSID processor 129 may determine the SSID based on the encrypted value, e.g., as described below.

In some demonstrative embodiments, SSID processor 129 may determine the encrypted value by using the hash value as an encryption key to encrypt a time-based parameter value, e.g., as described below.

In some demonstrative embodiments, the time-based parameter value may include a timestamp.

In some demonstrative embodiments, timestamp may be a time stamp of Neighbor Awareness Network (NAN) cluster time synchronization Function (TSF).

For example, SSID processor 129 may determine the SSID by using the hash value as an encryption key to encrypt a value, which is based on the NAN cluster TSF of the NAN cluster to which device 102 may belong.

In other embodiments, SSID processor 129 may determine the SSID by using the hash value as an encryption key to encrypt any other time-based parameter value, e.g., a value corresponding to any other time stamp, or any other time-related parameter, function and/or value.

In some demonstrative embodiments, SSID processor 129 may determine an encrypted value by using the hash value as an encryption key to encrypt a parameter value, which is monotonically increasing over time. According to these embodiments, the parameter value may include a timestamp and/or any other value, for example, a counter value, determined based on any suitable function, which is monotonically increasing in time.

In some demonstrative embodiments, SSID processor 129 may determine the encrypted value by applying an AES encryption function to encrypt the parameter value using the hash value as an AES encryption key.

In some demonstrative embodiments, using the AES encryption function may provide benefits, e.g., in terms of compliance with WLAN standards and/or protocols.

In other embodiments, SSID processor 129 may determine the encrypted value by applying any other encryption function to encrypt the parameter value using the hash value as an encryption key.

In some demonstrative embodiments, SSID processor 129 may be configured to determine the SSID to have a size, which may be based, for example, on the size of a service ID.

In some demonstrative embodiments, SSID processor 129 may be configured to determine the SSID to have the size of the service ID, e.g., six bytes.

In some demonstrative embodiments, SSID processor 129 may be configured to determine the SSID to have a size of six bytes. For example, SSID processor 129 may truncate the result of the cryptographic function to six bytes, e.g., as described below.

In some demonstrative embodiments, generating the SSID to have the size of the service ID may enable, for example, using the SSID, e.g., instead of the service ID, without for example, affecting the operation of, and/or compliance with, other devices, which may be configured to communicate the service ID.

In some demonstrative embodiments, SSID processor 129 may periodically receive an update of the service name key corresponding to the service, e.g., from the service provides, as described above.

In some demonstrative embodiments, SSID processor 129 may update the SSID based on the update of the service name key.

In some demonstrative embodiments, updating the SSID, e.g., along time, may increase the security of the SSID and/or may reduce the probability of an attacker to discover the service name of the service based on the SSID, e.g., compared to an implementation in which the SSID is kept constant.

In some demonstrative embodiments, radio 144 may receive the message, e.g., the discovery message, including the SSID, e.g., from device 102.

In some demonstrative embodiments, memory 184 may store one or more service names corresponding to one or more services, and one or more service name keys from one or more service providers of the one or more services, e.g., as described above.

In some demonstrative embodiments, device 140 may receive a service name key corresponding to a service, for example, from the service provider of the service, for example, at registration to the service, or at any other time before or after registration of device 140, application 145, and/or a user of device 140 to the service, e.g., as part of a "push" or "pull" update.

In some demonstrative embodiments, the service provider may include, for example, a web service provider of a web service, a cloud service provider of a cloud service, a local service provider of a local service, a remote service provider of a remote service, an Internet service provider of an Internet service, or any other type of service and/or service provider.

In some demonstrative embodiments, device 140 may receive, retrieve and/or "pull", e.g., periodically, an updated version of the service name key, e.g., from the "Service Provider", for example, according to a predefined update policy.

In some demonstrative embodiments, SSID processor 159 may be configured to process the received SSID, and to determine whether or not the received SSID is to represent a service name of the one or more service names stored by device 140, based on a service name key corresponding to the service name, e.g., as described below.

In some demonstrative embodiments, SSID processor 159 may iterate over the service names stored in memory 184, and for a service name, e.g., for each service name, SSID processor 159 may determine whether or not the received SSID corresponds to the service name, e.g., as described below.

In some demonstrative embodiments, SSID processor 159 may determine a hash value based on a hash of a combination of the service name key and the service name, and may determine an SSID of the service name by applying a cryptographic function to the hash value, e.g., as described above with respect to SSID processor 129.

In some demonstrative embodiments, SSID processor 159 may determine whether or not the received SSID is to represent the service name based on a comparison between the received SSID and the computed SSID of the service name, e.g., as calculated by SSID processor 159. For example, SSID processor 159 may determine that the received SSID is to represent the service name, e.g., if the received SSID matches the computed SSID of the service name, e.g., as calculated by SSID processor 159.

In some demonstrative embodiments, SSID processor 129 and/or SSID processor 159 may be configured to derive the SSID by performing one or more of the operations described below. In other embodiments, only some of these operations may be used, one or more additional or alternative operations may be used, or any other different operations may be used.

In some demonstrative embodiments, SSID processor 129 and/or SSID processor 159 may be configured to derive a truncated hash value, denoted SID-1, corresponding to a service name, for example, based on a combination of the service name and the service name key, e.g., as follows:

$$\text{SID-1}:=\text{truncate}(\text{SHA-256}(<l>\|\text{service-name-key}\|\text{service-name}),16 \text{ bytes}) \quad (1)$$

wherein:
<l>=length of service name in bits encoded as an 8 bit little-Endian integer;
service-name-key may be the key provided by the "Service Provider", e.g., at the time of service registration, and may be updated, e.g., periodically, for example, by pulling;
service-name may be, for example, an ASCII string representing the service name, e.g., as may be provided, for example, by the "Service Provider"; and
SID-1 may be, for example, 16 Octets long.

In some demonstrative embodiments, SSID processor 129 and/or SSID processor 159 may use the hash value SID-1, for example, as an encryption key, for example, an AES encryption key, or any other key, of a cryptographic function, e.g., an AES function or any other function, as described below.

In some demonstrative embodiments, SSID processor 129 and/or SSID processor 159 may derive the SSID, for example, by applying a Matyas-Meyer Oseas Construction function to the truncated hash value SID-1, e.g., as follows:

$$\text{SSID}:=\text{truncate}(\text{AES}(\text{SID-1},s)\text{XOR } s),6 \text{ bytes}) \quad (2)$$

wherein:
<ll>:=length of timestamp [|| other parameters] in bits encoded as an 8 bit little-Endian integer (in one example, must be ≤127)
s:=timestamp [|| other parameters] $\|1\|0^{128-<ll>-1}$
wherein $0^n$=a 0 bit repeated n times;
Timestamp may include a timestamp, for example, part of a NAN Timestamp. For example, Timestamp may be the top 4 byte of a NAN cluster Timestamp, or any other part of any other Timestamp or any other counter function or value, e.g., as described above.

In some demonstrative embodiments, SSID processor 129 and/or SSID processor 159 may derive the SSID, for example, by applying a Davies-Meyer Construction function to the truncated hash value SID-1, e.g., as follows:

$$\text{SSID}:=\text{truncate}(\text{AES}(s,\text{SID-1})\text{XOR SID-1}),6 \text{ bytes}) \quad (3)$$

In some demonstrative embodiments, SSID processor 129 and/or SSID processor 159 may derive the SSID, for example, by applying a Preneel-Miyaguchi Construction function to the truncated hash value SID-1, e.g., as follows:

$$\text{SSID}:=\text{truncate}(\text{AES}(\text{SID-1},s)\text{XOR SID-1XOR } s),6 \text{ bytes}) \quad (4)$$

In some demonstrative embodiments, SSID processor 129 and/or SSID processor 159 may derive the SSID, for example, by applying a Shrimpton-Stam Construction function to the truncated hash value SID-1, e.g., as follows:

$$\text{SSID}:=\text{truncate}(\text{AES}(\text{SID-3},\text{AES}(\text{SID-1},s)\text{XOR AES}(\text{SID-2},s))\text{XOR AES}(\text{SID-1},s)),6 \text{ bytes}) \quad (5)$$

Wherein SID-2 and SID-3 denote first and second additional truncated hash values, which may be determined based on the service name and service name key.

In other embodiments, SSID processor 129 and/or SSID processor 159 may derive the SSID, for example, by applying any other Construction function to the truncated hash value SID-1.

In some demonstrative embodiments, determining the SSID according to the Formulas 1, 2, 3, 4, and/or 5 may provide improved results, e.g., in terms of privacy, security, and the like.

In some demonstrative embodiments, pre-pending <l> to service-name-key||service-name may provide a prefix-free encoding for the service name.

In some demonstrative embodiments, such an encoding may enable a hash function, e.g., SHA-256, to act like a random oracle when applied to this function, e.g., according to the well-known results of Coron et al.

Accordingly, many types of attacks, for example, standard length extension attacks, against the key may not be efficient and/or may not work.

In some demonstrative embodiments, truncating the SHA-256, e.g., to 16 bytes, may provide a truncated hash value, which may have a length of an AES key, and/or may preserve 2nd pre-image resistance and/or pseudo-randomness.

In some demonstrative embodiments, this construction may be immune, for example, to guessing attacks, e.g., if the service-name-key is generated randomly.

In some demonstrative embodiments, the Matyas-Meyer-Oseas construction, as used in Formula 2 may preserve 2nd pre-image resistance, and/or may not expose AES to related-key attacks.

In some demonstrative embodiments, using the truncated hash value SID-1 as an AES encryption key may provide compatibility with implementations, e.g., WiFi implementations, which may be configured to support AES.

In some demonstrative embodiments, the SSID described above may provide improved protection and/or security, for example, compared to a computed Service ID, denoted SID2, which may be computed, for example, by hashing the service name, e.g., as follows:

$$\text{Compute SID1}:=\text{truncate}(\text{SHA-256}(\text{Service Name}),6 \text{ bytes}). \quad (6)$$

$$\text{Compute SID2}:=\text{TEA}(\text{SID-1},\text{timestamp}[\|\text{other parameters}])*$$

However, such a computations of the service ID SID2 may not be efficient. For example, since an attacker may know the Service name, the Timestamp and the other parameters used in the computation of SID2, the attacker may be able to compute the correct value of SID2 and, therefore, to identify the presence of the service, e.g., just as easily as a legitimate device.

In addition, this computation of the service ID SID2 introduces extra overhead, which may not be able to achieve sufficient protection and/or security.

In opposed to this computation of the service ID SID2, the SSID described above may be configured using a key, e.g., a cryptographic key. The use of a crypto primitive, e.g., as described above, may enable resisting attacks against its usage model, for example, 2nd pre-image attacks and guessing attacks, e.g., as described above.

Figure 2:
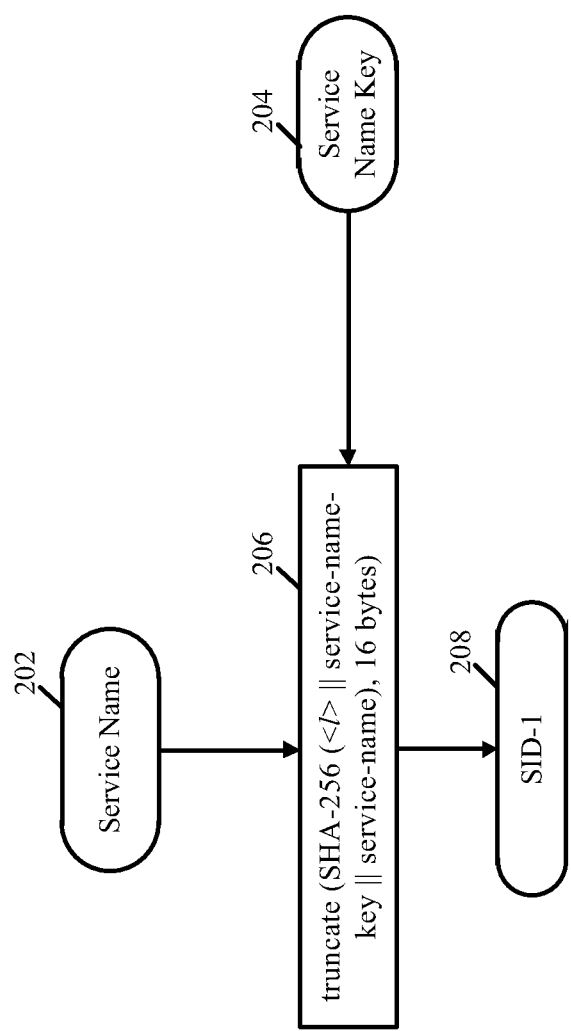
FIG. 2 is a schematic flow-chart illustration of a method of determining a hash value corresponding to a service name, in accordance with some demonstrative embodiments.

Reference is made to FIG. 2, which schematically illustrates a method of determining a hash value corresponding to a service name, in accordance with some demonstrative embodiments. For example, one or more of the operations of FIG. 2 may be performed by a SSID processor, e.g., SSID processor 129 and/or SSID processor 159 (FIG. 1), to determine a hash value corresponding to a service name, based on a service name key corresponding to the service name.

In some demonstrative embodiments, one or more operations of the method of FIG. 2 may be performed to generate, e.g., to pr-generate, one or more hash values, e.g., one or more SID-1 values, corresponding to one or more respective service names.

In one example, device 102 (FIG. 1) may maintain in a memory, e.g., memory 194 (FIG. 1), a list of a plurality of service names, and a plurality of service name keys corresponding to the service names, e.g., as described above. According to this example, SSID processor 129 (FIG. 1) may perform one or more operations of the method of FIG. 2 to determine a hash value, e.g., the hash value SID-1, corresponding to a service name.

In one example, SSID processor 129 (FIG. 1) may maintain in memory 194 (FIG. 1) a table, e.g., a look up table, including the calculated hash value SID-1 corresponding to each of the service names. For example, SSID processor 129 (FIG. 1) may update a hash value SID-1 corresponding to a service name, for example, upon receiving an updated service name key corresponding to the service name.

In another example, device 140 (FIG. 1) may maintain in a memory, e.g., memory 184 (FIG. 1), a list of a plurality of service names, and a plurality of service name keys corresponding to the service names, e.g., as described above. According to this example, SSID processor 159 (FIG. 1) may perform one or more operations of the method of FIG. 2 to determine a hash value, e.g., the hash value SID-1, corresponding to a service name.

In one example, SSID processor 159 (FIG. 1) may maintain in memory 184 (FIG. 1) a table, e.g., a look up table, including the calculated hash value SID-1 corresponding to each of the service names. For example, SSID processor 159 (FIG. 1) may update a hash value SID-1 corresponding to a service name, for example, upon receiving an updated service name key corresponding to the service name.

As indicated at block 202, the method may include receiving a service name corresponding to a service. For example, SSID processor 129 (FIG. 1) may retrieve a service name from memory 194 (FIG. 1); and/or SSID processor 159 (FIG. 1) may retrieve a service name from memory 184 (FIG. 1).

As indicated at block 204, the method may include receiving a service name key corresponding to the service. For example, SSID processor 129 (FIG. 1) may retrieve a service name key from memory 194 (FIG. 1); and/or SSID processor 159 (FIG. 1) may retrieve a service name key from memory 184 (FIG. 1).

As indicated at block 206, the method may include determining the truncated hash value SID-1 based on a hash of a combination of the service name key and the service name. For example, SSID processor 129 (FIG. 1) may determine the hash value SID-1, e.g., according to Formula 1; and/or SSID processor 159 (FIG. 1) may determine the hash value SID-1, e.g., according to Formula 1.

As indicated at block 208, the method may include maintaining the truncated hash value SID-1. For example, SSID processor 129 may store the calculated hash value SID-1 in memory 194 (FIG. 1), e.g., in association with the service name; and/or SSID processor 159 may store the calculated hash value SID-1 in memory 184 (FIG. 1), e.g., in association with the service name.

Figure 3:
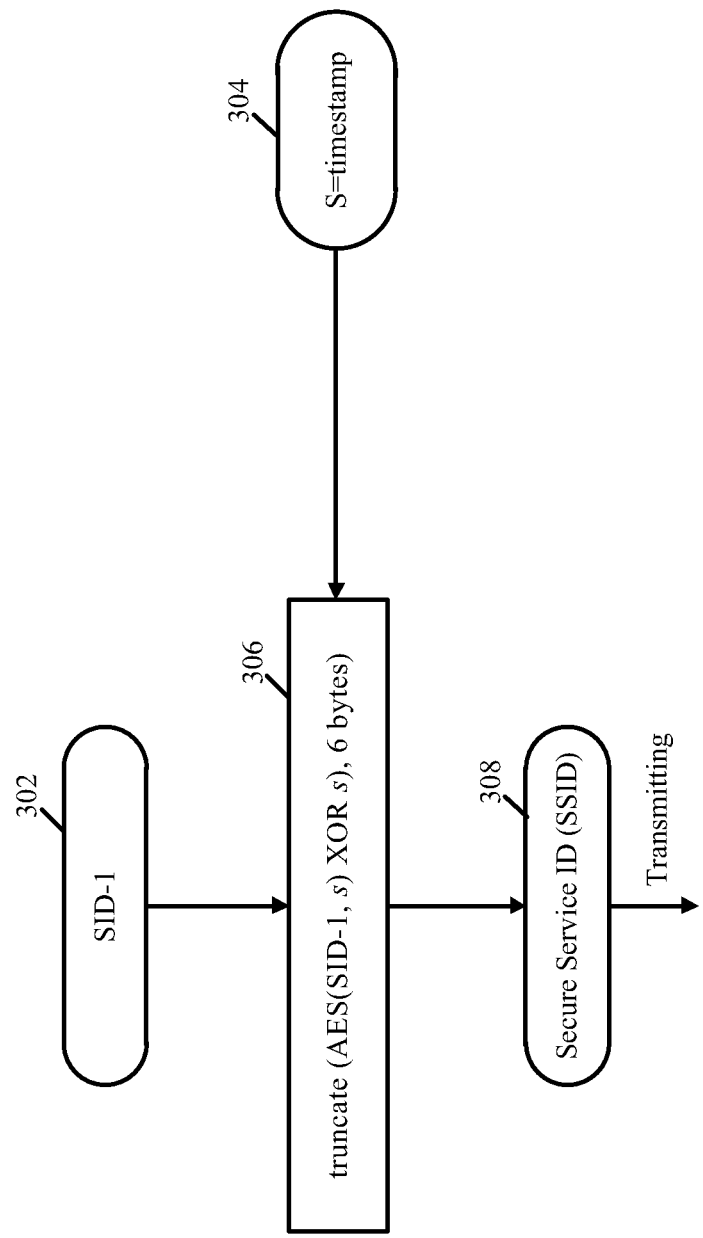
FIG. 3 is a schematic flow-chart illustration of a method of determining a Secure Service Identifier (SSID), in accordance with some demonstrative embodiments.

Reference is made to FIG. 3, which schematically illustrates a method of determining a SSID, in accordance with some demonstrative embodiments. For example, one or more of the operations of FIG. 3 may be performed by a SSID processor, e.g., SSID processor 129 and/or 159 (FIG. 1), to determine an SSID corresponding to a service name.

As indicated at block 302, the method may include receiving a hash value corresponding to the service name. For example, SSID processor 129 (FIG. 1) may calculate the hash value SID-1 corresponding to the service name, or may retrieve from memory 184 (FIG. 1) the pre-calculated hash value SID-1 corresponding to the service name.

As indicated at block 304, the method may include receiving a timestamp. For example, SSID processor 129 (FIG. 1) may receive a timestamp, e.g., a NAN cluster timestamp or any other timestamp, e.g., as described above.

As indicated at block 306, the method may include calculating the SSID by applying a cryptographic function to the hash value and the timestamp. For example, SSID processor 129 (FIG. 1) may determine the SSID according to Formula 2, e.g., as described above.

As indicated at bock 308, the method may include outputting the SSID. For example, SSID processor 129 (FIG. 1) may output the SSID, for example, to message processor 18 (FIG. 1), controller 124 (FIG. 1) and/or radio 114 (FIG. 1).

Figure 4:
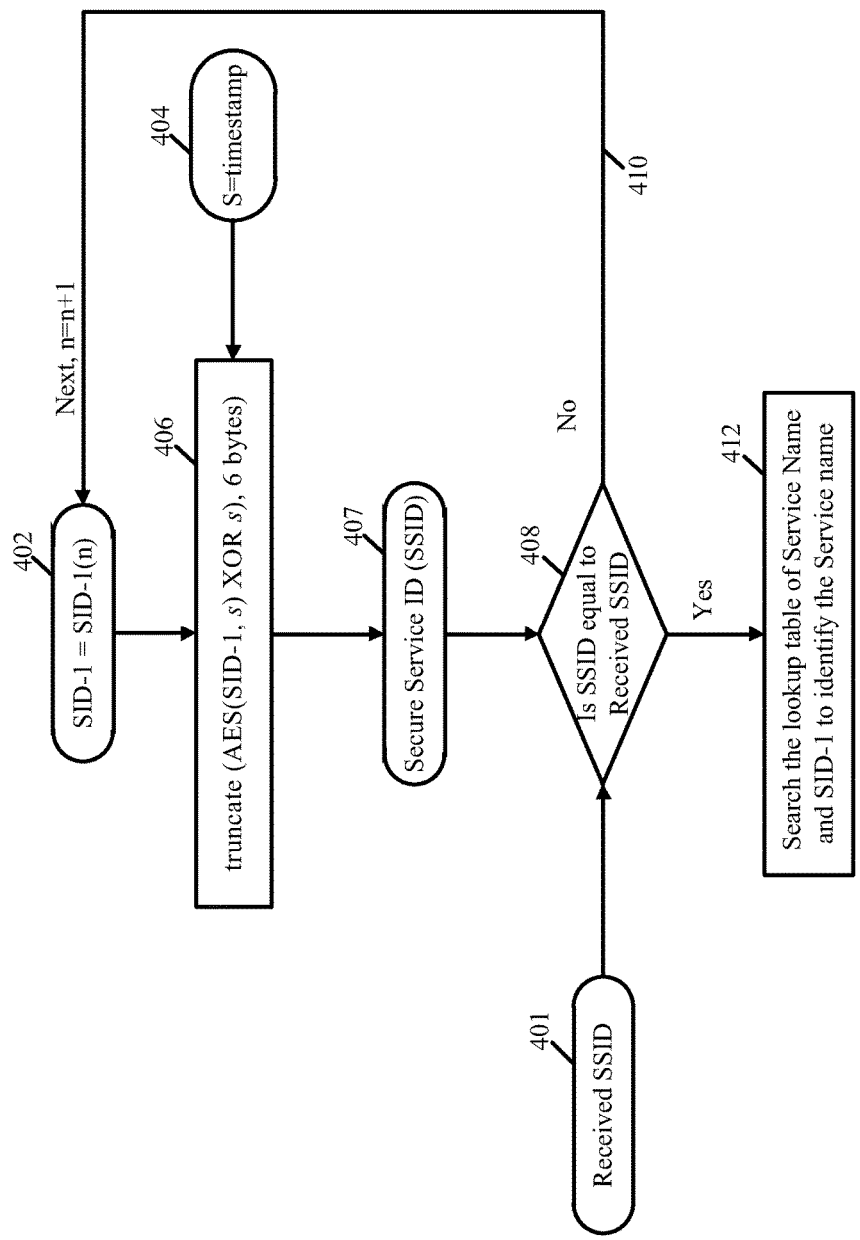
FIG. 4 is a schematic flow-chart illustration of a method of processing a received SSID, in accordance with some demonstrative embodiments.

Reference is made to FIG. 4, which schematically illustrates a method of processing a received SSID, in accordance with some demonstrative embodiments. For example, one or more operations of the method of FIG. 4 may be performed by a SSID processor, e.g., SSID processor 159 (FIG. 1), to process a received SSID.

As indicated at block 401, the method may include receiving a SSID. For example, radio 144 (FIG. 1) may receive a message including an SSID, e.g., as described above.

As indicated at block 402, the method may include determining a hash value corresponding to a service name. For example, SSID processor 159 (FIG. 1) may determine a hash value SID-1 corresponding to a stored service name, for example, of a service name selected from a plurality of stored service names stored by device 140 (FIG. 1), e.g., as described above.

As indicated at block 404, the method may include receiving a timestamp. For example, SSID processor 159 (FIG. 1) may receive a timestamp, e.g., a NAN cluster timestamp or any other timestamp, e.g., as described above.

As indicated at block 407, the method may include calculating the SSID by applying (406) a cryptographic function to the hash value and the timestamp. For example, SSID processor 159 (FIG. 1) may determine the SSID according to Formula 2, e.g., as described above.

As indicated at block 408, the method may include comparing the calculated SSID to the received SSID. For example, SSID processor 159 (FIG. 1) may compare the received SSID to the calculated SSID corresponding to the hash value SID-1, e.g., as described above.

As indicated at block 412, the method may include determining that the received SSID corresponds to the stored service name corresponding to the hash value SID-1, for example, if the received SSID matches the calculated SSID. For example, SSID processor 159 (FIG. 1) may identify the stored service name to correspond to the received SSID, for example, if the received SSID matches the calculated SSID.

As indicated by arrow 410, the method may include iterating over another hash value SID-1 corresponding to another stored service name, for example, if the received SSID is different from the calculated SSID. For example, SSID processor 159 (FIG. 1) may select another hash value SID-1 corresponding to another service name stored by device 140 (FIG. 1), and may repeat the operations of blocks 402, 404, 406, 407, 408 and 410 with respect to the other hash value SID-1, for example, until iterating over all service names or until a match is detected between the received SSID and a calculated SSID.

Figure 5:
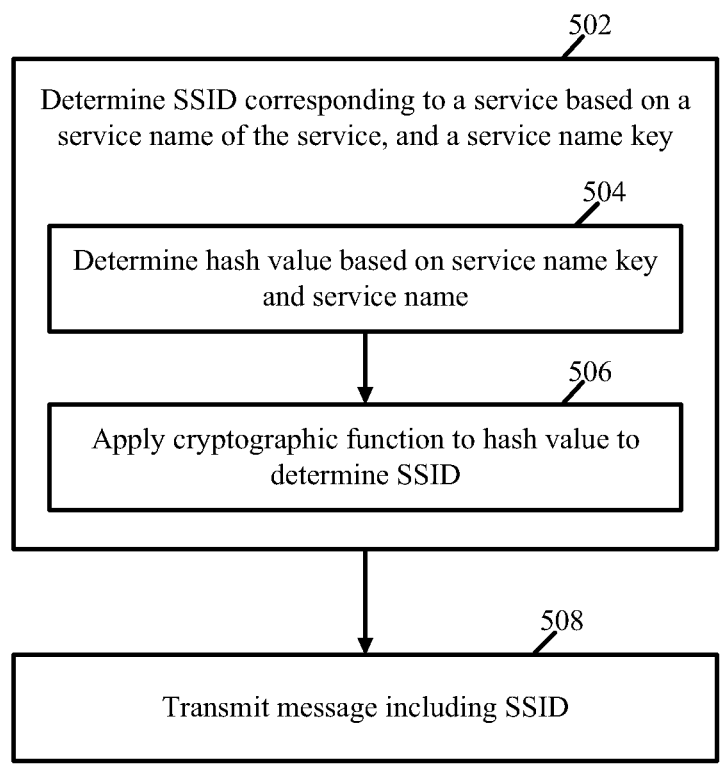
FIG. 5 is a schematic flow-chart illustration of a method of transmitting a message including a SSID, in accordance with some demonstrative embodiments.

Reference is made to FIG. 5, which schematically illustrates a method of transmitting a message including a SSID, in accordance with some demonstrative embodiments. For example, one or more of the operations of the method of FIG. 5 may be performed by a device, for example, device 102 (FIG. 1).

As indicated at block 502, the method may include determining a SSID corresponding to a service, the SSID including an encrypted value being based on a service name key and a service name corresponding to the service. For example, SSID processor 129 (FIG. 1) may determine the SSID corresponding to a service name of a service, e.g., as described above.

As indicated at block 504, determining the SSID may include determining a hash value based on a hash of a combination of the service name key and the service name. For example, SSID processor 129 (FIG. 1) may determine the hash value SID-1, for example, according to Formula 1, e.g., as described above.

As indicated at block 506, determining the SSID may include determining the SSID by applying a cryptographic function to the hash value. For example, SSID processor 129 (FIG. 1) may determine the SSID by applying a cryptographic function to the hash value SID-1, for example, according to Formula 2, e.g., as described above.

As indicated at block 508, the method may include transmitting a wireless message including the SSID. For example, radio 114 (FIG. 1) may transmit a message 139 (FIG. 1) including the SSID, e.g., as described above.

Figure 6:
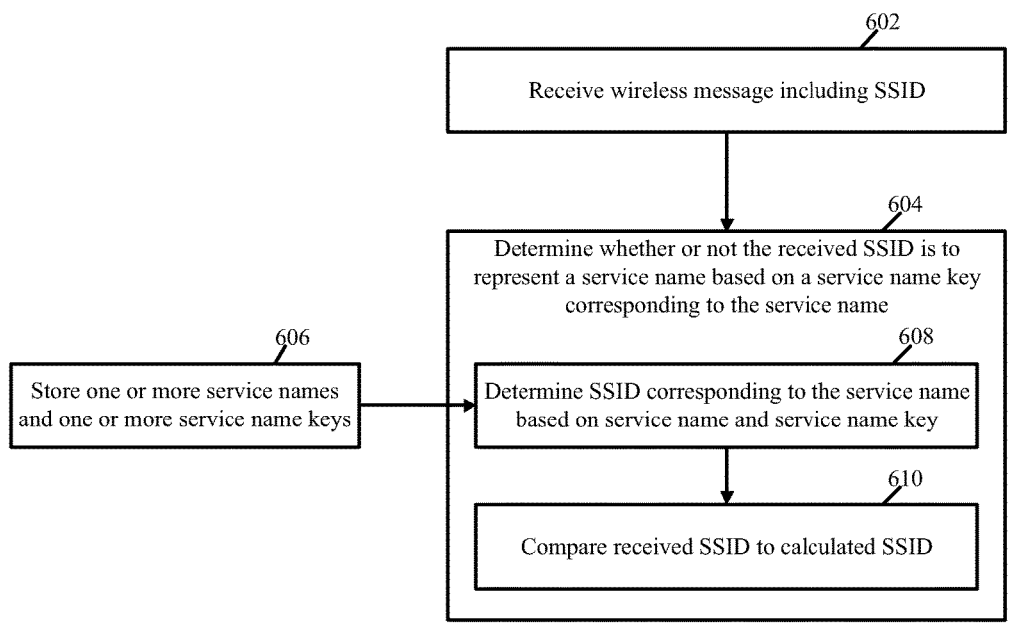
FIG. 6 is a schematic flow-chart illustration of a method of receiving a message including a SSID, in accordance with some demonstrative embodiments.

Reference is made to FIG. 6, which schematically illustrates a method of receiving a message including a SSID, in accordance with some demonstrative embodiments. For example, one or more of the operations of FIG. 6 may be performed by a device, e.g., device 140 (FIG. 1).

As indicated at block 602, the method may include receiving a wireless message including a received SSID. For example, radio 144 (FIG. 1) may receive a message including an SSID, e.g., as described above.

As indicated at block 604, the method may include processing the received SSID to determine whether or not the received SSID is to represent a service name of one or more service names, based on a service name key corresponding to the service name. For example, SSID processor 159 (FIG. 1) may determine whether or not the received SSID represents a service name of ne or more service names, e.g., as described above.

As indicated at block 606, the method may include storing one or more service names corresponding to the one or more services, and one or more service name keys from one or more service providers of the one or more services. For example, device 140 (FIG. 1) may store the plurality of service names and the plurality of service name keys in memory 184 (FIG. 1), e.g., as described above.

As indicated at block 608, the method may include determining a SSID corresponding to the service name based on the service name and the service name key corresponding to the service name. For example, SSID processor 159 (FIG. 1) may determine the SSID of the service name, for example, according to Formulas 1 and 2, e.g., as described above.

As indicated at block 610, the method may include determining whether or not the received SSID is to represent the service name based on a comparison between the received SSID and the SSID corresponding to the service name. For example, SSID processor 159 (FIG. 1) may determine whether or not the received SSID is to represent the service name based on a comparison between the received SSID and the SSID corresponding to the service name, e.g., as described above.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102 (FIG. 1), and/or 140 (FIG. 1), SSID processors 129 and/or 159 (FIG. 1), controllers 124 and/or 154 (FIG. 1), message processors 128 (FIG. 1) and/or 158 (FIG. 1), radios 114 and/or 144 (FIG. 1), transmitters 118 and/or 148 (FIG. 1), receivers 116 and/or 146 (FIG. 1), and/or to perform one or more operations of the methods of FIGS. 2, 3, 4, 5, and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless device comprising a Secure Service Identifier (SSID) processor to determine a SSID corresponding to a service, the SSID including an encrypted value being based on a service name key from a service provider of the service and a service name corresponding to the service; and a radio to transmit a wireless message including the SSID.

Example 2 includes the subject matter of Example 1, and optionally, wherein the SSID processor is to determine a hash value based on a hash of a combination of the service name key and the service name, and to determine the SSID by applying a cryptographic function to the hash value.

Example 3 includes the subject matter of Example 2, and optionally, wherein the cryptographic function is a one-way cryptographic compression function.

Example 4 includes the subject matter of Example 3, and optionally, wherein the one-way cryptographic compression function is a Matyas-Meyer Oseas Construction function.

Example 5 includes the subject matter of any one of Examples 2-4, and optionally, wherein the SSID processor is to determine an encrypted value by using the hash value as an encryption key to encrypt a parameter value, and to determine the SSID based on the encrypted value.

Example 6 includes the subject matter of Example 5, and optionally, wherein the parameter value is time-based.

Example 7 includes the subject matter of Example 6, and optionally, wherein the parameter value comprises a timestamp.

Example 8 includes the subject matter of Example 7, and optionally, wherein the timestamp is a time stamp of Neighbor Awareness Network (NAN) cluster time synchronization Function (TSF).

Example 9 includes the subject matter of any one of Examples 6-8, and optionally, wherein the parameter value is monotonically increasing over time.

Example 10 includes the subject matter of any one of Examples 5-9, and optionally, wherein the SSID processor is to determine the encrypted value by applying an Advanced Encryption Standard (AES) encryption function to encrypt the parameter value using the hash value as an AES encryption key.

Example 11 includes the subject matter of any one of Examples 2-10, and optionally, wherein the hash value comprises a truncated hash value, the SSID processor is to determine the truncated hash value by truncating a hash of the combination of the service name key and the service name.

Example 12 includes the subject matter of Example 11, and optionally, wherein the truncated hash value has a byte-size of an encryption-key byte-size of the cryptographic function.

Example 13 includes the subject matter of any one of Examples 1-12, and optionally, wherein the radio is to transmit a discovery frame including the SSID in a service identifier (SID) field.

Example 14 includes the subject matter of Example 13, and optionally, wherein the discovery frame is a Neighbor Awareness Network (NAN) discovery frame.

Example 15 includes the subject matter of Example 13, and optionally, wherein the discovery frame is a Wireless Fidelity (WiFi) Direct Services (WFDS) discovery frame.

Example 16 includes the subject matter of any one of Examples 1-15, and optionally, wherein the SSID processor is to periodically receive an update of the service name key, and to update the SSID based on the update of the service name key.

Example 17 includes the subject matter of any one of Examples 1-16, and optionally, wherein the SSID has a size of six bytes.

Example 18 includes the subject matter of any one of Examples 1-17 being a Wireless Fidelity (Wi-Fi) direct device.

Example 19 includes the subject matter of any one of Examples 1-18 including one or more antennas, and a memory.

Example 20 includes a wireless device comprising a memory to store one or more service names corresponding to one or more services, and one or more service name keys from one or more service providers of the one or more services; a radio to receive a wireless message including a received Secure Service Identifier (SSID); and a SSID processor to process the received SSID, the SSID processor to determine whether or not the received SSID is to represent a service name of the one or more service names, based on a service name key corresponding to the service name.

Example 21 includes the subject matter of Example 20, and optionally, wherein the SSID processor is to determine a hash value based on a hash of a combination of the service name key and the service name, to determine an SSID of the service name by applying a cryptographic function to the hash value, and to determine whether or not the received SSID is to represent the service name based on a comparison between the received SSID and the SSID of the service name.

Example 22 includes the subject matter of Example 21, and optionally, wherein the cryptographic function is a one-way cryptographic compression function.

Example 23 includes the subject matter of Example 22, and optionally, wherein the one-way cryptographic compression function is a Matyas-Meyer Oseas Construction function.

Example 24 includes the subject matter of any one of Examples 21-23, and optionally, wherein the SSID processor is to determine an encrypted value by using the hash value as an encryption key to encrypt a parameter value, and to determine the SSID of the service name based on the encrypted value.

Example 25 includes the subject matter of Example 24, and optionally, wherein the parameter value is time-based.

Example 26 includes the subject matter of Example 25, and optionally, wherein the parameter value comprises a timestamp.

Example 27 includes the subject matter of Example 26, and optionally, wherein the timestamp is a time stamp of Neighbor Awareness Network (NAN) cluster time synchronization Function (TSF).

Example 28 includes the subject matter of any one of Examples 25-27, and optionally, wherein the parameter value is monotonically increasing over time.

Example 29 includes the subject matter of any one of Examples 24-28, and optionally, wherein the SSID processor is to determine the encrypted value by applying an Advanced Encryption Standard (AES) encryption function to encrypt the parameter value using the hash value as an AES encryption key.

Example 30 includes the subject matter of any one of Examples 21-29, and optionally, wherein the hash value comprises a truncated hash value, the SSID processor is to determine the truncated hash value by truncating a hash of the combination of the service name key and the service name.

Example 31 includes the subject matter of Example 30, and optionally, wherein the truncated hash value has a byte-size of an encryption-key byte-size of the cryptographic function.

Example 32 includes the subject matter of any one of Examples 20-31, and optionally, wherein the radio is to receive a discovery frame including the SSID in a service identifier (SID) field.

Example 33 includes the subject matter of Example 32, and optionally, wherein the discovery frame is a Neighbor Awareness Network (NAN) discovery frame.

Example 34 includes the subject matter of Example 32, and optionally, wherein the discovery frame is a Wireless Fidelity (WiFi) Direct Services (WFDS) discovery frame.

Example 35 includes the subject matter of any one of Examples 20-34, and optionally, wherein the SSID processor is to periodically receive an update of the service name key.

Example 36 includes the subject matter of any one of Examples 20-35, and optionally, wherein the SSID has a size of six bytes.

Example 37 includes the subject matter of any one of Examples 20-36 being a Wireless Fidelity (Wi-Fi) direct device.

Example 38 includes the subject matter of any one of Examples 20-37 including one or more antennas.

Example 39 includes a system of wireless communication, the system comprising one or more antennas; a memory; a Secure Service Identifier (SSID) processor to determine a SSID corresponding to a service, the SSID including an encrypted value being based on a service name key from a service provider of the service and a service name corresponding to the service; and a radio to transmit a wireless message including the SSID.

Example 40 includes the subject matter of Example 39, and optionally, wherein the SSID processor is to determine a hash value based on a hash of a combination of the service name key and the service name, and to determine the SSID by applying a cryptographic function to the hash value.

Example 41 includes the subject matter of Example 40, and optionally, wherein the cryptographic function is a one-way cryptographic compression function.

Example 42 includes the subject matter of Example 41, and optionally, wherein the one-way cryptographic compression function is a Matyas-Meyer Oseas Construction function.

Example 43 includes the subject matter of any one of Examples 40-42, and optionally, wherein the SSID processor is to determine an encrypted value by using the hash value as an encryption key to encrypt a parameter value, and to determine the SSID based on the encrypted value.

Example 44 includes the subject matter of Example 43, and optionally, wherein the parameter value is time-based.

Example 45 includes the subject matter of Example 44, and optionally, wherein the parameter value comprises a timestamp.

Example 46 includes the subject matter of Example 45, and optionally, wherein the timestamp is a time stamp of Neighbor Awareness Network (NAN) cluster time synchronization Function (TSF).

Example 47 includes the subject matter of any one of Examples 44-46, and optionally, wherein the parameter value is monotonically increasing over time.

Example 48 includes the subject matter of any one of Examples 43-47, and optionally, wherein the SSID processor is to determine the encrypted value by applying an Advanced Encryption Standard (AES) encryption function to encrypt the parameter value using the hash value as an AES encryption key.

Example 49 includes the subject matter of any one of Examples 40-48, and optionally, wherein the hash value comprises a truncated hash value, the SSID processor is to determine the truncated hash value by truncating a hash of the combination of the service name key and the service name.

Example 50 includes the subject matter of Example 49, and optionally, wherein the truncated hash value has a byte-size of an encryption-key byte-size of the cryptographic function.

Example 51 includes the subject matter of any one of Examples 39-50, and optionally, wherein the radio is to transmit a discovery frame including the SSID in a service identifier (SID) field.

Example 52 includes the subject matter of Example 51, and optionally, wherein the discovery frame is a Neighbor Awareness Network (NAN) discovery frame.

Example 53 includes the subject matter of Example 51, and optionally, wherein the discovery frame is a Wireless Fidelity (WiFi) Direct Services (WFDS) discovery frame.

Example 54 includes the subject matter of any one of Examples 39-53, and optionally, wherein the SSID processor is to periodically receive an update of the service name key, and to update the SSID based on the update of the service name key.

Example 55 includes the subject matter of any one of Examples 39-54, and optionally, wherein the SSID has a size of six bytes.

Example 56 includes the subject matter of any one of Examples 39-55 including a Wireless Fidelity (Wi-Fi) direct device.

Example 57 includes a system of wireless communication, the system comprising one or more antennas; a memory to store one or more service names corresponding to one or more services, and one or more service name keys from one or more service providers of the one or more services; a radio to receive a wireless message including a received Secure Service Identifier (SSID); and a SSID processor to process the received SSID, the SSID processor to determine whether or not the received SSID is to represent a service name of the one or more service names, based on a service name key corresponding to the service name.

Example 58 includes the subject matter of Example 57, and optionally, wherein the SSID processor is to determine a hash value based on a hash of a combination of the service name key and the service name, to determine an SSID of the service name by applying a cryptographic function to the hash value, and to determine whether or not the received SSID is to represent the service name based on a comparison between the received SSID and the SSID of the service name.

Example 59 includes the subject matter of Example 58, and optionally, wherein the cryptographic function is a one-way cryptographic compression function.

Example 60 includes the subject matter of Example 59, and optionally, wherein the one-way cryptographic compression function is a Matyas-Meyer Oseas Construction function.

Example 61 includes the subject matter of any one of Examples 58-60, and optionally, wherein the SSID processor is to determine an encrypted value by using the hash value as an encryption key to encrypt a parameter value, and to determine the SSID of the service name based on the encrypted value.

Example 62 includes the subject matter of Example 61, and optionally, wherein the parameter value is time-based.

Example 63 includes the subject matter of Example 62, and optionally, wherein the parameter value comprises a timestamp.

Example 64 includes the subject matter of Example 63, and optionally, wherein the timestamp is a time stamp of Neighbor Awareness Network (NAN) cluster time synchronization Function (TSF).

Example 65 includes the subject matter of any one of Examples 62-64, and optionally, wherein the parameter value is monotonically increasing over time.

Example 66 includes the subject matter of any one of Examples 61-65, and optionally, wherein the SSID processor is to determine the encrypted value by applying an Advanced Encryption Standard (AES) encryption function to encrypt the parameter value using the hash value as an AES encryption key.

Example 67 includes the subject matter of any one of Examples 58-66, and optionally, wherein the hash value comprises a truncated hash value, the SSID processor is to determine the truncated hash value by truncating a hash of the combination of the service name key and the service name.

Example 68 includes the subject matter of Example 67, and optionally, wherein the truncated hash value has a byte-size of an encryption-key byte-size of the cryptographic function.

Example 69 includes the subject matter of any one of Examples 57-68, and optionally, wherein the radio is to receive a discovery frame including the SSID in a service identifier (SID) field.

Example 70 includes the subject matter of Example 69, and optionally, wherein the discovery frame is a Neighbor Awareness Network (NAN) discovery frame.

Example 71 includes the subject matter of Example 69, and optionally, wherein the discovery frame is a Wireless Fidelity (WiFi) Direct Services (WFDS) discovery frame.

Example 72 includes the subject matter of any one of Examples 57-71, and optionally, wherein the SSID processor is to periodically receive an update of the service name key.

Example 73 includes the subject matter of any one of Examples 57-72, and optionally, wherein the SSID has a size of six bytes.

Example 74 includes the subject matter of any one of Examples 57-73 including a Wireless Fidelity (Wi-Fi) direct device.

Example 75 includes a method to be performed at a wireless device, the method comprising determining a Secure Service Identifier (SSID) corresponding to a service, the SSID including an encrypted value being based on a service name key from a service provider of the service and a service name corresponding to the service; and transmitting a wireless message including the SSID.

Example 76 includes the subject matter of Example 75, and optionally, comprising determining a hash value based on a hash of a combination of the service name key and the service name, and determining the SSID by applying a cryptographic function to the hash value.

Example 77 includes the subject matter of Example 76, and optionally, wherein the cryptographic function is a one-way cryptographic compression function.

Example 78 includes the subject matter of Example 77, and optionally, wherein the one-way cryptographic compression function is a Matyas-Meyer Oseas Construction function.

Example 79 includes the subject matter of any one of Examples 76-78, and optionally, comprising determining an encrypted value by using the hash value as an encryption key to encrypt a parameter value, and determining the SSID based on the encrypted value.

Example 80 includes the subject matter of Example 79, and optionally, wherein the parameter value is time-based.

Example 81 includes the subject matter of Example 80, and optionally, wherein the parameter value comprises a timestamp.

Example 82 includes the subject matter of Example 81, and optionally, wherein the timestamp is a time stamp of Neighbor Awareness Network (NAN) cluster time synchronization Function (TSF).

Example 83 includes the subject matter of any one of Examples 80-82, and optionally, wherein the parameter value is monotonically increasing over time.

Example 84 includes the subject matter of any one of Examples 79-83, and optionally, comprising determining the encrypted value by applying an Advanced Encryption Standard (AES) encryption function to encrypt the parameter value using the hash value as an AES encryption key.

Example 85 includes the subject matter of any one of Examples 76-84, and optionally, wherein the hash value comprises a truncated hash value, the method comprising determining the truncated hash value by truncating a hash of the combination of the service name key and the service name.

Example 86 includes the subject matter of Example 85, and optionally, wherein the truncated hash value has a byte-size of an encryption-key byte-size of the cryptographic function.

Example 87 includes the subject matter of any one of Examples 75-86, and optionally, comprising transmitting a discovery frame including the SSID in a service identifier (SID) field.

Example 88 includes the subject matter of Example 87, and optionally, wherein the discovery frame is a Neighbor Awareness Network (NAN) discovery frame.

Example 89 includes the subject matter of Example 87, and optionally, wherein the discovery frame is a Wireless Fidelity (WiFi) Direct Services (WFDS) discovery frame.

Example 90 includes the subject matter of any one of Examples 75-89, and optionally, comprising periodically receiving an update of the service name key, and updating the SSID based on the update of the service name key.

Example 91 includes the subject matter of any one of Examples 75-90, and optionally, wherein the SSID has a size of six bytes.

Example 92 includes a method to be performed by a wireless device, the method comprising storing one or more service names corresponding to one or more services, and one or more service name keys from one or more service providers of the one or more services; receiving a wireless message including a received Secure Service Identifier (SSID); and processing the received SSID to determine whether or not the received SSID is to represent a service name of the one or more service names, based on a service name key corresponding to the service name.

Example 93 includes the subject matter of Example 92, and optionally, comprising determining a hash value based on a hash of a combination of the service name key and the service name, determining an SSID of the service name by applying a cryptographic function to the hash value, and determining whether or not the received SSID is to represent the service name based on a comparison between the received SSID and the SSID of the service name.

Example 94 includes the subject matter of Example 93, and optionally, wherein the cryptographic function is a one-way cryptographic compression function.

Example 95 includes the subject matter of Example 94, and optionally, wherein the one-way cryptographic compression function is a Matyas-Meyer Oseas Construction function.

Example 96 includes the subject matter of any one of Examples 93-95, and optionally, comprising determining an encrypted value by using the hash value as an encryption key to encrypt a parameter value, and determining the SSID of the service name based on the encrypted value.

Example 97 includes the subject matter of Example 96, and optionally, wherein the parameter value is time-based.

Example 98 includes the subject matter of Example 97, and optionally, wherein the parameter value comprises a timestamp.

Example 99 includes the subject matter of Example 98, and optionally, wherein the timestamp is a time stamp of Neighbor Awareness Network (NAN) cluster time synchronization Function (TSF).

Example 100 includes the subject matter of any one of Examples 97-99, and optionally, wherein the parameter value is monotonically increasing over time.

Example 101 includes the subject matter of any one of Examples 96-100, and optionally, comprising determining the encrypted value by applying an Advanced Encryption Standard (AES) encryption function to encrypt the parameter value using the hash value as an AES encryption key.

Example 102 includes the subject matter of any one of Examples 93-101, and optionally, wherein the hash value comprises a truncated hash value, the method comprising determining the truncated hash value by truncating a hash of the combination of the service name key and the service name.

Example 103 includes the subject matter of Example 102, and optionally, wherein the truncated hash value has a byte-size of an encryption-key byte-size of the cryptographic function.

Example 104 includes the subject matter of any one of Examples 92-103, and optionally, comprising receiving a discovery frame including the SSID in a service identifier (SID) field.

Example 105 includes the subject matter of Example 104, and optionally, wherein the discovery frame is a Neighbor Awareness Network (NAN) discovery frame.

Example 106 includes the subject matter of Example 104, and optionally, wherein the discovery frame is a Wireless Fidelity (WiFi) Direct Services (WFDS) discovery frame.

Example 107 includes the subject matter of any one of Examples 92-106, and optionally, comprising periodically receiving an update of the service name key.

Example 108 includes the subject matter of any one of Examples 92-107, and optionally, wherein the SSID has a size of six bytes.

Example 109 includes a product including one or more tangible computer-readable non-transitory storage media comprising computer-executable instructions operable to, when executed by at least one computer processor, enable the at least one computer processor to implement a method comprising determining a Secure Service Identifier (SSID) corresponding to a service, the SSID including an encrypted value being based on a service name key from a service provider of the service and a service name corresponding to the service; and transmitting a wireless message including the SSID.

Example 110 includes the subject matter of Example 109, and optionally, wherein the method comprises determining a hash value based on a hash of a combination of the service name key and the service name, and determining the SSID by applying a cryptographic function to the hash value.

Example 111 includes the subject matter of Example 110, and optionally, wherein the cryptographic function is a one-way cryptographic compression function.

Example 112 includes the subject matter of Example 111, and optionally, wherein the one-way cryptographic compression function is a Matyas-Meyer Oseas Construction function.

Example 113 includes the subject matter of any one of Examples 110-112, and optionally, wherein the method comprises determining an encrypted value by using the hash value as an encryption key to encrypt a parameter value, and determining the SSID based on the encrypted value.

Example 114 includes the subject matter of Example 113, and optionally, wherein the parameter value is time-based.

Example 115 includes the subject matter of Example 114, and optionally, wherein the parameter value comprises a timestamp.

Example 116 includes the subject matter of Example 115, and optionally, wherein the timestamp is a time stamp of Neighbor Awareness Network (NAN) cluster time synchronization Function (TSF).

Example 117 includes the subject matter of any one of Examples 114-116, and optionally, wherein the parameter value is monotonically increasing over time.

Example 118 includes the subject matter of any one of Examples 113-117, and optionally, wherein the method comprises determining the encrypted value by applying an Advanced Encryption Standard (AES) encryption function to encrypt the parameter value using the hash value as an AES encryption key.

Example 119 includes the subject matter of any one of Examples 110-118, and optionally, wherein the hash value comprises a truncated hash value, the method comprising determining the truncated hash value by truncating a hash of the combination of the service name key and the service name.

Example 120 includes the subject matter of Example 119, and optionally, wherein the truncated hash value has a byte-size of an encryption-key byte-size of the cryptographic function.

Example 121 includes the subject matter of any one of Examples 109-120, and optionally, wherein the method comprises transmitting a discovery frame including the SSID in a service identifier (SID) field.

Example 122 includes the subject matter of Example 121, and optionally, wherein the discovery frame is a Neighbor Awareness Network (NAN) discovery frame.

Example 123 includes the subject matter of Example 121, and optionally, wherein the discovery frame is a Wireless Fidelity (WiFi) Direct Services (WFDS) discovery frame.

Example 124 includes the subject matter of any one of Examples 109-123, and optionally, wherein the method comprises periodically receiving an update of the service name key, and updating the SSID based on the update of the service name key.

Example 125 includes the subject matter of any one of Examples 109-124, and optionally, wherein the SSID has a size of six bytes.

Example 126 includes a product including one or more tangible computer-readable non-transitory storage media comprising computer-executable instructions operable to, when executed by at least one computer processor, enable the at least one computer processor to implement a method comprising storing one or more service names corresponding to one or more services, and one or more service name keys from one or more service providers of the one or more services; receiving a wireless message including a received Secure Service Identifier (SSID); and processing the received SSID to determine whether or not the received SSID is to represent a service name of the one or more service names, based on a service name key corresponding to the service name.

Example 127 includes the subject matter of Example 126, and optionally, wherein the method comprises determining a hash value based on a hash of a combination of the service name key and the service name, determining an SSID of the service name by applying a cryptographic function to the hash value, and determining whether or not the received SSID is to represent the service name based on a comparison between the received SSID and the SSID of the service name.

Example 128 includes the subject matter of Example 127, and optionally, wherein the cryptographic function is a one-way cryptographic compression function.

Example 129 includes the subject matter of Example 128, and optionally, wherein the one-way cryptographic compression function is a Matyas-Meyer Oseas Construction function.

Example 130 includes the subject matter of any one of Examples 127-129, and optionally, wherein the method comprises determining an encrypted value by using the hash value as an encryption key to encrypt a parameter value, and determining the SSID of the service name based on the encrypted value.

Example 131 includes the subject matter of Example 130, and optionally, wherein the parameter value is time-based.

Example 132 includes the subject matter of Example 131, and optionally, wherein the parameter value comprises a timestamp.

Example 133 includes the subject matter of Example 132, and optionally, wherein the timestamp is a time stamp of Neighbor Awareness Network (NAN) cluster time synchronization Function (TSF).

Example 134 includes the subject matter of any one of Examples 131-133, and optionally, wherein the parameter value is monotonically increasing over time.

Example 135 includes the subject matter of any one of Examples 130-134, and optionally, wherein the method comprises determining the encrypted value by applying an Advanced Encryption Standard (AES) encryption function to encrypt the parameter value using the hash value as an AES encryption key.

Example 136 includes the subject matter of any one of Examples 127-135, and optionally, wherein the hash value comprises a truncated hash value, the method comprising determining the truncated hash value by truncating a hash of the combination of the service name key and the service name.

Example 137 includes the subject matter of Example 136, and optionally, wherein the truncated hash value has a byte-size of an encryption-key byte-size of the cryptographic function.

Example 138 includes the subject matter of any one of Examples 126-137, and optionally, wherein the method comprises receiving a discovery frame including the SSID in a service identifier (SID) field.

Example 139 includes the subject matter of Example 138, and optionally, wherein the discovery frame is a Neighbor Awareness Network (NAN) discovery frame.

Example 140 includes the subject matter of Example 138, and optionally, wherein the discovery frame is a Wireless Fidelity (WiFi) Direct Services (WFDS) discovery frame.

Example 141 includes the subject matter of any one of Examples 126-140, and optionally, wherein the method comprises periodically receiving an update of the service name key.

Example 142 includes the subject matter of any one of Examples 126-141, and optionally, wherein the SSID has a size of six bytes.

Example 143 includes an apparatus of wireless communication, the apparatus comprising means for determining a Secure Service Identifier (SSID) corresponding to a service, the SSID including an encrypted value being based on a service name key from a service provider of the service and a service name corresponding to the service; and means for transmitting a wireless message including the SSID.

Example 144 includes the subject matter of Example 143, and optionally, comprising means for determining a hash value based on a hash of a combination of the service name key and the service name, and determining the SSID by applying a cryptographic function to the hash value.

Example 145 includes the subject matter of Example 144, and optionally, wherein the cryptographic function is a one-way cryptographic compression function.

Example 146 includes the subject matter of Example 145, and optionally, wherein the one-way cryptographic compression function is a Matyas-Meyer Oseas Construction function.

Example 147 includes the subject matter of any one of Examples 144-146, and optionally, comprising means for determining an encrypted value by using the hash value as an encryption key to encrypt a parameter value, and determining the SSID based on the encrypted value.

Example 148 includes the subject matter of Example 147, and optionally, wherein the parameter value is time-based.

Example 149 includes the subject matter of Example 148, and optionally, wherein the parameter value comprises a timestamp.

Example 150 includes the subject matter of Example 149, and optionally, wherein the timestamp is a time stamp of Neighbor Awareness Network (NAN) cluster time synchronization Function (TSF).

Example 151 includes the subject matter of any one of Examples 148-150, and optionally, wherein the parameter value is monotonically increasing over time.

Example 152 includes the subject matter of any one of Examples 147-151, and optionally, comprising means for determining the encrypted value by applying an Advanced Encryption Standard (AES) encryption function to encrypt the parameter value using the hash value as an AES encryption key.

Example 153 includes the subject matter of any one of Examples 144-152, and optionally, wherein the hash value comprises a truncated hash value, the apparatus comprising means for determining the truncated hash value by truncating a hash of the combination of the service name key and the service name.

Example 154 includes the subject matter of Example 153, and optionally, wherein the truncated hash value has a byte-size of an encryption-key byte-size of the cryptographic function.

Example 155 includes the subject matter of any one of Examples 143-154, and optionally, comprising means for transmitting a discovery frame including the SSID in a service identifier (SID) field.

Example 156 includes the subject matter of Example 155, and optionally, wherein the discovery frame is a Neighbor Awareness Network (NAN) discovery frame.

Example 157 includes the subject matter of Example 155, and optionally, wherein the discovery frame is a Wireless Fidelity (WiFi) Direct Services (WFDS) discovery frame.

Example 158 includes the subject matter of any one of Examples 143-157, and optionally, comprising means for periodically receiving an update of the service name key, and updating the SSID based on the update of the service name key.

Example 159 includes the subject matter of any one of Examples 143-158, and optionally, wherein the SSID has a size of six bytes.

Example 160 includes an apparatus of wireless communication, the apparatus comprising means for storing one or more service names corresponding to one or more services, and one or more service name keys from one or more service providers of the one or more services; means for receiving a wireless message including a received Secure Service Identifier (SSID); and means fro processing the received SSID to determine whether or not the received SSID is to represent a service name of the one or more service names, based on a service name key corresponding to the service name.

Example 161 includes the subject matter of Example 160, and optionally, comprising means for determining a hash value based on a hash of a combination of the service name key and the service name, determining an SSID of the service name by applying a cryptographic function to the hash value, and determining whether or not the received SSID is to represent the service name based on a comparison between the received SSID and the SSID of the service name.

Example 162 includes the subject matter of Example 161, and optionally, wherein the cryptographic function is a one-way cryptographic compression function.

Example 163 includes the subject matter of Example 162, and optionally, wherein the one-way cryptographic compression function is a Matyas-Meyer Oseas Construction function.

Example 164 includes the subject matter of any one of Examples 161-163, and optionally, comprising means for determining an encrypted value by using the hash value as an encryption key to encrypt a parameter value, and determining the SSID of the service name based on the encrypted value.

Example 165 includes the subject matter of Example 164, and optionally, wherein the parameter value is time-based.

Example 166 includes the subject matter of Example 165, and optionally, wherein the parameter value comprises a timestamp.

Example 167 includes the subject matter of Example 166, and optionally, wherein the timestamp is a time stamp of Neighbor Awareness Network (NAN) cluster time synchronization Function (TSF).

Example 168 includes the subject matter of any one of Examples 165-167, and optionally, wherein the parameter value is monotonically increasing over time.

Example 169 includes the subject matter of any one of Examples 164-168, and optionally, comprising means for determining the encrypted value by applying an Advanced Encryption Standard (AES) encryption function to encrypt the parameter value using the hash value as an AES encryption key.

Example 170 includes the subject matter of any one of Examples 161-169, and optionally, wherein the hash value comprises a truncated hash value, the apparatus comprising means for determining the truncated hash value by truncating a hash of the combination of the service name key and the service name.

Example 171 includes the subject matter of Example 170, and optionally, wherein the truncated hash value has a byte-size of an encryption-key byte-size of the cryptographic function.

Example 172 includes the subject matter of any one of Examples 160-171, and optionally, comprising means for receiving a discovery frame including the SSID in a service identifier (SID) field.

Example 173 includes the subject matter of Example 172, and optionally, wherein the discovery frame is a Neighbor Awareness Network (NAN) discovery frame.

Example 174 includes the subject matter of Example 172, and optionally, wherein the discovery frame is a Wireless Fidelity (WiFi) Direct Services (WFDS) discovery frame.

Example 175 includes the subject matter of any one of Examples 160-174, and optionally, comprising means for periodically receiving an update of the service name key.

Example 176 includes the subject matter of any one of Examples 160-175, and optionally, wherein the SSID has a size of six bytes.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory, and a processor configured to cause a Neighbor Awareness Networking (NAN) device to:
   determine a secure service Identifier (ID) to identify a service in a group of NAN devices, the secure service ID is based on a hash function of a group key and of a service name corresponding to the service, the group key comprising a key to be shared by the group of NAN devices; and transmit a NAN service discovery frame comprising the secure service ID.

2. The apparatus of claim 1, wherein the secure service ID is based on a time-based value.

3. The apparatus of claim 1, wherein the secure service ID is based on a value of a NAN Time Synchronization Function (TSF).

4. The apparatus of claim 3, wherein the secure service ID is based on a value of a partial number of bits of the NAN TSF.

5. The apparatus of claim 3, wherein the secure service ID is based on a value of 4 top bytes of the NAN TSF.

6. The apparatus of claim 3, wherein the NAN TSF comprises a NAN cluster TSF of a NAN cluster.

7. The apparatus of claim 1, wherein the NAN service discovery frame comprises the secure service ID in a service ID field.

8. The apparatus of claim 1 configured to cause the NAN device to periodically update the secure service ID.

9. The apparatus of claim 1 configured to cause the NAN device to determine another secure service ID corresponding to another group of NAN devices based on another group key.

10. The apparatus of claim 1, wherein the hash function comprises a Secure Hash Algorithm 256 (SHA-256) function.

11. The apparatus of claim 1, wherein the secure service ID has a size of 6 bytes.

12. The apparatus of claim 1, wherein the secure service ID comprises a pseudo-random service ID.

13. The apparatus of claim 1, wherein the group key comprises a key from a web service provider.

14. The apparatus of claim 1 comprising a Medium Access Control (MAC) component, and a Physical Layer (PHY).

15. The apparatus of claim 1 comprising a radio.

16. The apparatus of claim 1 comprising an input unit, an output unit, and a storage unit.

17. The apparatus of claim 1 comprising one or more antennas.

18. A product comprising one or more tangible computer-readable non-transitory storage media comprising computer-executable instructions operable to, when executed by at least one processor, enable the at least one processor to cause a Neighbor Awareness Networking (NAN) device to:
determine a secure service Identifier (ID) to identify a service in a group of NAN devices, the secure service ID is based on a hash function of a group key and of a service name corresponding to the service, the group key comprising a key shared by the group of NAN devices; and
transmit a NAN service discovery frame comprising the secure service ID.

19. The product of claim 18, wherein the secure service ID is based on a time-based value.

20. The product of claim 18, wherein the secure service ID is based on a value of a NAN Time Synchronization Function (TSF).

21. The product of claim 20, wherein the secure service ID is based on a value of a partial number of bits of the NAN TSF.

22. The product of claim 18, wherein the NAN service discovery frame comprises the secure service ID in a service ID field.

23. The product of claim 18, wherein the instructions, when executed, cause the NAN device to periodically update the secure service ID.

24. The product of claim 18, wherein the secure service ID comprises a pseudo-random service ID.

25. The product of claim 18, wherein the group key comprises a key from a web service provider.

26. An apparatus comprising a memory, and a processor configured to cause a first Neighbor Awareness Networking (NAN) device to:
determine a secure service Identifier (ID) to identify a service in a group of NAN devices, the secure service ID is based on a hash function of a group key and of a service name corresponding to the service, the group key comprising a key to be shared by the group of NAN devices;
receive a NAN service discovery frame from a second NAN device in the group of NAN devices, the NAN service discovery frame comprising the secure service ID; and
process the secure service ID in the NAN service discovery frame based on a determination that the secure service ID in the NAN service discovery frame is to represent the service name of the service.

27. The apparatus of claim 26, wherein the secure service ID is based on a time-based value.

28. The apparatus of claim 26, wherein the secure service ID is based on a value of a NAN Time Synchronization Function (TSF).

29. The apparatus of claim 28, wherein the secure service ID is based on a value of a partial number of bits of the NAN TSF.

30. The apparatus of claim 28, wherein the secure service ID is based on a value of 4 top bytes of the NAN TSF.

31. The apparatus of claim 28, wherein the NAN TSF comprises a NAN cluster TSF of a NAN cluster.

32. The apparatus of claim 26, wherein the NAN service discovery frame comprises the secure service ID in a service ID field.

33. The apparatus of claim 26 configured to cause the first NAN device to periodically update the secure service ID.

34. The apparatus of claim 26 configured to cause the first NAN device to determine another secure service ID corresponding to another group of NAN devices based on another group key.

35. The apparatus of claim 26, wherein the hash function comprises a Secure Hash Algorithm 256 (SHA-256) function.

36. The apparatus of claim 26, wherein the secure service ID has a size of 6 bytes.

37. The apparatus of claim 26, wherein the secure service ID comprises a pseudo-random service ID.

38. The apparatus of claim 26, wherein the group key comprises a key from a web service provider.

39. The apparatus of claim 26 comprising a Medium Access Control (MAC) component, and a Physical Layer (PHY).

40. The apparatus of claim 26 comprising a radio.

41. The apparatus of claim 26 comprising an input unit, an output unit, and a storage unit.

42. The apparatus of claim 26 comprising one or more antennas.

43. A product comprising one or more tangible computer-readable non-transitory storage media comprising computer-executable instructions operable to, when executed by at least one processor, enable the at least one processor to cause a first Neighbor Awareness Networking (NAN) device to:
determine a secure service Identifier (ID) to identify a service in a group of NAN devices, the secure service ID is based on a hash function of a group key and of a service name corresponding to the service, the group key comprising a key to be shared by the group of NAN devices;

receive a NAN service discovery frame from a second NAN device in the group of NAN devices, the NAN service discovery frame comprising the secure service ID; and process the secure service ID in the NAN service discovery frame based on a determination that the secure service ID in the NAN service discovery frame is to represent the service name of the service.

44. The product of claim 43, wherein the secure service ID is based on a time-based value.

45. The product of claim 43, wherein the secure service ID is based on a value of a NAN Time Synchronization Function (TSF).

46. The product of claim 45, wherein the secure service ID is based on a value of 4 top bytes of the NAN TSF.

47. The product of claim 43, wherein the NAN service discovery frame comprises the secure service ID in a service ID field.

48. The product of claim 43, wherein the instructions, when executed, cause the first NAN device to periodically update the secure service ID.

49. The product of claim 43, wherein the secure service ID comprises a pseudo-random service ID.

50. The product of claim 43, wherein the group key comprises a key from a web service provider.

* * * * *